Patented Jan. 26, 1932

1,842,978

UNITED STATES PATENT OFFICE

FRANCIS B. MORTON, OF PARLIN, NEW JERSEY, ASSIGNOR TO E. I. DU PONT DE NEMOURS & COMPANY, OF WILMINGTON, DELAWARE, A CORPORATION OF DELAWARE

COATING COMPOSITION FOR FIBROUS MATERIALS

No Drawing.    Application filed June 27, 1928.   Serial No. 288,809.

This invention relates to coating compositions and more particularly to a coating composition for leather, imitation leather, rubber latex impregnated paper, etc.

A pigmented finish for leathers was developed during the recent war, due to the shortage of dyestuffs for coloring leather, encountered at that time. It was composed of pigments of maximum hiding power incorporated in alkaline solutions of shellac or casein to which were added various other ingredients, such as wax emulsions, albumen, water soluble oils and glycerine. By the use of this pigmented finish a uniform color was obtained on the leather, whereas a dyed leather was not uniform in color due to the fact that some portions of the leather absorbed more dye than others. In addition, the pigmented finish covered stains and blemishes so that leather which was formerly suited only for blacks could be used for other colors. This pigmented finish was, however, seriously defective in that it rubbed off easily on a wet cloth, since the binder was soluble in water, and in many cases the finish produced a brittle film on the leather which easily cracked off. More recently there has been used a nitrocellulose pigmented finish for grain leather, applied by spraying, in which a mixture of nitrocellulose and suitable softeners is substituted as a binder in place of the water soluble binders used in the original type of pigmented finish. This nitrocellulose finish is objectionable in that its properties are such that it cannot be ironed out with a hot flat iron nor can it be glazed with a glazing machine.

This invention has as an object the production of a finish for leather, imitation leather, rubber latex impregnated paper, etc., which is not water soluble and which will not easily crack off. A further object is the production of such a finish which may be ironed with a hot flat iron and glazed with a glazing machine without injurious results to the finish. Other objects will appear hereinafter.

These objects are accomplished by the following invention, which, in its broadest aspect, consists in adding an adherent oil to a cellulose derivative which may contain any suitable softener and may be pigmented or clear.

I have discovered that a finish having the desired properties may be obtained by the incorporation of certain oils and, while in the examples to follow I have used neat's-foot oil, these properties may likewise be imparted to the finish by the use of certain other oils, specifically, cod liver, sperm, lard, olive, egg and a mixture of cocoanut and paraffine oils; and for the sake of convenience I term these oils "adherent oils." It is to be understood that the term "adherent oils" is meant to include the specific oils mentioned and is used for lack of a group classification which covers all these oils.

The following formulæ represent a preferred composition at spraying consistency and the range for the materials at which a workable finish can be obtained:—

| Color coat | | Range |
|---|---|---|
| Nitrocellulose | —2.5% by wt. | 2.5% (by wt.) |
| Neat's-foot oil | —5.0 by wt. | 1 to 8 |
| Dibutyl phthalate | —1.5 by wt. | 0 to 2.5 |
| Pigment or dye | —5.0 by wt. | 0.1 to 10 |

| Clear top coat | | Range |
|---|---|---|
| Nitrocellulose | —2.5% by wt. | 2.5% |
| Neat's-foot oil | —2.5 by wt. | 1 to 8 |

The range for the amount of nitrocellulose in these compositions will depend on its viscosity and the method of application and may be from 1 to 10. Compositions are therefore based on 2.5% nitrocellulose, as the ratio of the non-volatile ingredients is an important factor. The amount of pigment will depend on the type used, its oil absorption value, its hiding power and the effect which is desired. When transparency, or so-called depth of finish, is desired, lakes or even dyes may be used. The pigments should preferably be inert in their action towards nitrocellulose and resistant to fading on exposure to light. In the example given above, dibutyl phthalate is not asbolutely essential, its presence being due to the fact that the pigment may be ground on colloid rolls, in the same manner as pigment is incorporated in celluloid, by grinding in a plastic of dibutyl phthalate and nitrocellulose, which method gives extremely good dispersion. The pigment may also be ground on buhr mills or roller mills in part or all of the neat's-foot oil in the manner customary in the paint industry. The ratio of pigment to colloid or oil during grinding will depend on the character of the pigment and the particular colloid or oil used, as is well known to those skilled in the art. It is not necessary that the adherent oil be the only oil present. Castor, rapeseed, linseed or other animal or vegetable oils may be present, so long as there is sufficient adherent oil to counteract the effect of these oils, which used alone produce a finish which cannot be successfully glazed or ironed. Also more dibutyl phthalate or other cellulose plasticizer than is required to make a suitable colloid may be present with the adherent oil. In such cases, the pigment may be ground on buhr mills or other mills with part or all of such oils or plasticizers.

It is not absolutely essential to use adherent oil in all of the coats, but only in the top coat, since stickiness is due to the condition of the surface. For example, a top coat of clear or enamel containing neat's-foot oil may be used over nitrocellulose colored coats of the old type. They may also be used over the water soluble type of colored coat, but due to deficient adhesion the nitrocellulose type of colored bottom coat is to be preferred.

The preferred nitrocellulose colored and clear coats may be made into finished mixtures by the customary methods employed in the lacquer and enamel industry. The colors are ground in a nitrocellulose plastic and the ground stock is then dissolved in suitable mixers with a thinner containing active solvents and diluents. The clear solutions are made by dissolving nitrocellulose in suitable mixers with a mixture of active solvents and diluents and adding the proper amount of adherent oil. The clear solutions may also be made from concentrated solutions of nitrocellulose by adding the proper amount of thinner and adherent oil. The following formulæ represent a preferred enamel and a clear solution:—

*Red enamel*
| | |
|---|---|
| Indian red iron oxide pigment | 11.11% |
| Nitrocellulose plastic | 8.56 |
| Neat's-foot oil—20° F. cold pressed | 7.40 |
| Butyl acetate | 23.15 |
| Ethyl acetate | 26.63 |
| Benzine | 23.15 |
| | 100.00% |

*Clear solution*
| | |
|---|---|
| Nitrocellulose base | 43.50% |
| Neat's-foot oil 20° F. | 4.00 |
| Butyl acetate | 10.00 |
| Ethyl acetate | 20.00 |
| Toluol | 22.50 |
| | 100.00% |

*Nitrocellulose plastic*
| | |
|---|---|
| Nitrocellulose | 43.70% |
| Dibutyl phthalate | 26.20 |
| Denatured alcohol | 30.10 |
| | 100.00% |

*Nitrocellulose base*
| | |
|---|---|
| Ethyl acetate | 43.25% |
| Benzol | 36.22 |
| Toluol | 9.05 |
| Denatured alcohol | 2.30 |
| Pyroxylin | 9.18 |
| | 100.00% |

The above finishes may preferably be applied in two coats, one colored coat followed by a clear coat, and they should be applied by spraying as this method is found to be the most practicable one.

The clear and pigmented compositions containing adherent oil are suitable for use in coating fabrics or for use as top coats on pyroxylin coated fabrics, such as Fabrikoid. The preferred pigmented mixture would be made in this case by adding the pigment, which has been ground in adherent oil in a buhr or roller mill, to a concentrated nitrocellulose mixture, adding if necessary more adherent oil and then thinning to the proper consistency. The mixture is applied to the fabric or as a top coat by a coating machine by methods identical with those used in the manufacture of pyroxylin coated fabrics, such as Fabrikoid. The clear solution may be used when high gloss is desired, or when it is necessary to obtain a finish which will not rub off. The preferred mixtures produce a finish which is free from tackiness and which possesses a leather-like feel. The finish can be printed with a leather grain or smoothed with a flat plate in a press without sticking. The mixtures containing adherent oil which are suitable for use on coated fabrics, as described above, can also be used for coating latex impregnated paper or as top coats on such paper which has been coated with a pyroxylin material. The mixtures may preferably be applied by coating machines in the same manner as in the manufacture of Fabrikoid. These mixtures are also suitable for coating paper bases impregnated with materials other than rubber latex.

While in the examples I have described nitrocellulose compositions, my invention may be utilized in compositions containing any cellulose derivative.

As many apparently widely different embodiments of this invention may be made without departing from the spirit and scope thereof, it is to be understood that I do not limit myself to the specific embodiments thereof except as defined in the appended claims.

I claim:

1. A coating composition containing cellulose nitrate, a plasticizer, and neat's-foot oil added in an amount sufficient to render the composition adherent to leather and to provide a finish free from tackiness which can be ironed with a hot iron and glazed with a glazing machine.

2. A coating composition containing cellulose nitrate, a plasticizer, and one of the following group of oils in an amount sufficient to render the composition adherent to leather and to provide a finish free from tackiness which can be ironed and glazed, the said group of oils consisting of neat's-foot oil, cod liver oil, sperm oil, lard oil, olive oil, egg oil, and a mixture of cocoanut and paraffin oils.

In testimony whereof, I affix my signature.

FRANCIS B. MORTON.